No. 702,464. Patented June 17, 1902.
C. F. J. NISS.
PHOTOGRAPHIC CAMERA.
(Application filed Sept. 25, 1901.)
(No Model.)
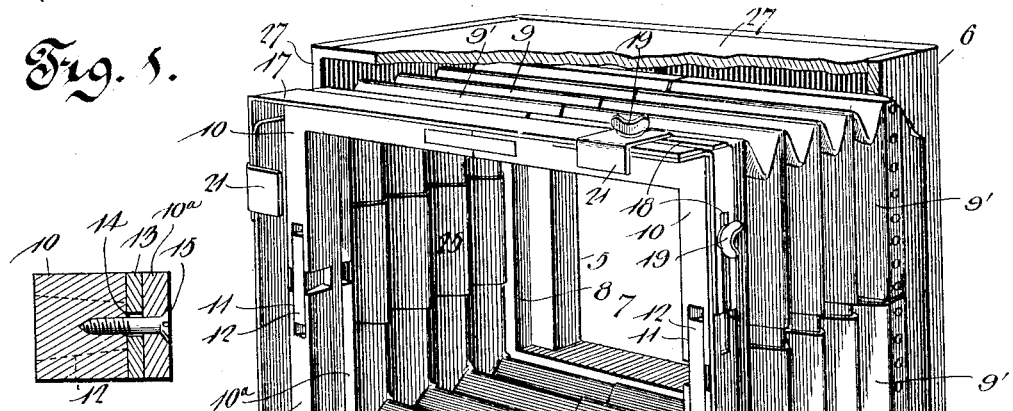
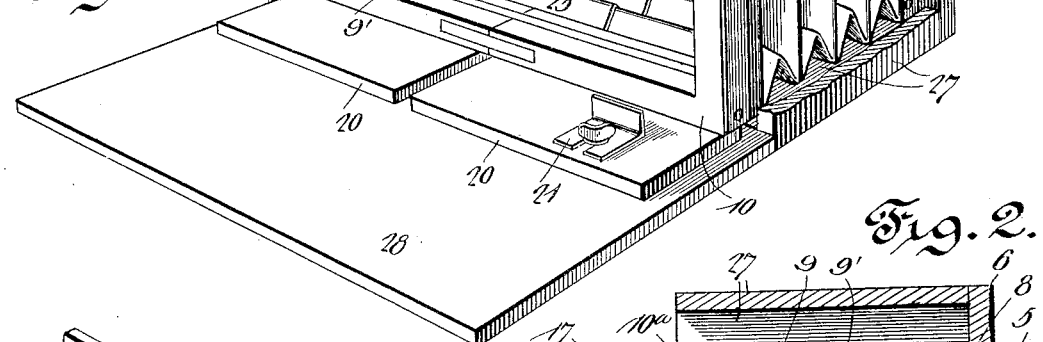
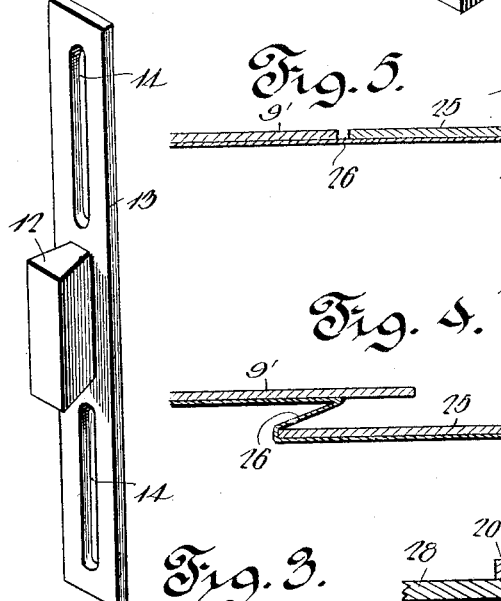
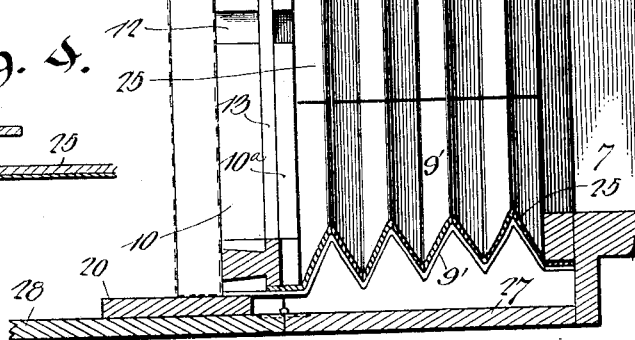
Witnesses
Christian F. J. Niss, Inventor
by C. A. Snow & Co.
Attorneys

UNITED STATES PATENT OFFICE.

CHRISTIAN FREDERIK JULIUS NISS, OF HINCKLEY, ILLINOIS.

PHOTOGRAPHIC CAMERA.

SPECIFICATION forming part of Letters Patent No. 702,464, dated June 17, 1902.

Application filed September 25, 1901. Serial No. 76,560. (No model.)

*To all whom it may concern:*

Be it known that I, CHRISTIAN FREDERIK JULIUS NISS, a subject of the King of Denmark, residing at Hinckley, in the county of Dekalb and State of Illinois, have invented a new and useful Photographic Camera, of which the following is a specification.

My invention relates to certain improvements in photograph-cameras, and has for its principal object to provide an attachment which will enable the operator to take pictures of any size within the limit of the lens.

A further object is to so construct the attachment as to render it adjustable to plate-holders and focusing-glasses of a variety of sizes and to provide for the adjustment of the distance between the lens and the sensitive plate to any distance suitable for either short or long focus photographs.

With these and other objects in view the invention consists in the novel construction and arrangement of parts hereinafter described, illustrated in the accompanying drawings, and particularly pointed out in the appended claims.

In the accompanying drawings, Figure 1 is a perspective view, partly in section, of an attachment for a photograph-camera constructed in accordance with my invention. Fig. 2 is a longitudinal sectional elevation of the same. Fig. 3 is a detached perspective view of a detail of construction of the device. Figs. 4 and 5 are detail views of a portion of the bellows, illustrating the construction of the overlapping portions for permitting the adjustment of the bellows.

Similar numerals of reference are employed to designate corresponding parts throughout the several views of the drawings.

5 designates a rectangular flange projecting from the front board of the attachment and designed to enter or partially enter the opening at the rear board of an ordinary camera—that is to say, that portion of the camera where the focusing-glass and plate-holders are situated. At this point of connection any suitable covering-strips may be employed in order to exclude light; but in all cases such covering-strips are not necessary owing to the fact that the attachment will generally be made to fit standard sizes of cameras, the flange 5 being made of the proper dimensions to snugly fit within the rear opening of a four-by-five or five-by-eight or such other size as may be desired. The flange 5 surrounds and in part forms the walls of an opening 7, and at the rear of this opening the front board 6 is provided with a second flange 8, to which is secured a front portion of the bellows 9, the rear portion of said bellows being connected to the various parts of a sectional frame, which may be adjusted vertically or horizontally or in both directions to accommodate a plate-holder of the required size. The adjustable frame comprises four corner-sections 10, each in the form of a right angle, and the adjacent ends of each section being provided with a dovetail slot 11 for the reception of a similarly-shaped connecting-block 12, the latter being secured to or formed integral with a front plate 13, extending for the full length of that side of the frame of which it forms a part and being provided with vertically-disposed slots 14, through which may pass pins or screws 15, uniting the corner-pieces 10 with auxiliary corner-pieces 10', as shown in Fig. 6. The construction of the frame is such as to permit of its expansion and contraction both vertically and horizontally, and in order to lock the various parts in an adjusted position and at the same time to exclude light metallic strips are arranged on each side and corner of the frame. The strips 17 each have one end rigidly secured to one of the corner-pieces, and the opposite end of each strip is provided with an elongated slot 18, through which may pass a thumb-screw 19 into the opposite corner-piece, as illustrated in Fig. 1. When the sections of the frame are to be adjusted, the various thumb-screws are loosened and the frame is spread until it assumes the desired shape and size. The thumb-screws are then tightened and in various sections of the frame are rigidly secured together.

In order to provide a rest and guide for a focusing-glass or a plate-holder, the strips 17 at the top and at one side of the attachment are extended rearwardly for a sufficient distance to form, in connection with the lower board 20, a suitable rest and support for the holder. As a further precaution clips 21 are arranged at the top, bottom, and at one side of the frame, each clip being adjustable rearwardly to a greater or less distance from the frame in order to accommodate plate-holders of varying thickness.

The bellows 9 is in many respects similar to that ordinarily in use; but each of its sides and its top and bottom are divided longitudinally between the sectional frame and the flange 8, the bellows being thus formed into four right-angled corner-sections 9', one of which is attached to each of the corner-sections 10 of the adjustable frame. On the inside of the bellows the longitudinal slits are covered by strips 25 of a width equal to the length of the dovetail blocks 12 and each being formed, preferably, of a material similar to that forming the main body of the bellows and following closely all the convolutions of the latter. The main sections and auxiliary sections of the bellows are covered, as usual, with black fabric in order to exclude light, and each side of each of the strips 25 is connected to the adjacent corner-sections of the bellows by a strip 26, also formed of black fabric and permitting of the free movement of the bellows in expanding or contracting and at the same time acting at all times to exclude light.

To the front board 6 of the attachment are secured top, bottom, and side boards 27, which extend rearwardly for a distance sufficient to inclose the attachment when fully contracted, and to the rear lower board is hinged a suitable cover 28, which may be closed to protect the attachment when not in use.

The focusing-glass which I propose to employ will ordinarily be of a size equal to the size of the adjustable frame when fully contracted, and when the frame is expanded for the taking of pictures of larger size the focusing-glass may be turned on and gradually moved across the rear of the frame, so that all parts of the exposure area may be seen.

With an attachment of this character I am enabled not only to increase the focal length of the camera to any desired distance, but am also enabled to expose a sensitive plate of any area within the limits of the lens.

The present invention is not limited to an attachment for a camera, but may in itself be considered as a camera by providing at its front board a suitable lens. Pictures of any size may then be taken by the camera proper by providing a bellows of sufficient length and connecting such bellows to the described adjustable frame.

While the construction herein described and illustrated is the preferred form of the device, it is apparent that changes may be made in the form, proportions, and minor details of construction without departing from the spirit or sacrificing any of the advantages of the invention.

Having thus described my invention, what I claim is—

1. In a camera, a bellows having a rear opening, said bellows being adjustable to permit the contraction and expansion of said opening.

2. In a camera, a bellows having longitudinal divisions and covering-strips therefor.

3. In a camera, a bellows divided longitudinally into a number of sections, covering-strips arranged at the division-point, said covering-strips being flexibly connected to the body of the bellows.

4. In a photographic camera, an extensible rear frame having adjustable members to permit its expansion and contraction.

5. In a photographic camera, a fixed forward frame, and extensible rear frame having adjustable members to permit its expansion and contraction, and a laterally-adjustable bellows connecting said frames.

6. In a photographic camera, a frame having corner-sections, central blocks connecting the corner-sections, a bellows divided longitudinally and having its main body portion formed into sections connected to said corner-sections, covering-strips arranged at the divisional points, said covering-strips being secured to said blocks, substantially as specified.

7. In a photographic camera, a rear frame having adjustable corner-sections, central blocks adapted to recesses in the corner-sections, exterior slotted strips on said frame, means for locking the frame in any adjusted position, and an adjustable bellows connected to said frame, substantially as specified.

8. In a photographic camera, a sectional frame, plate-holding clips secured thereto, said clips being adjustable to different distances from the rear of the frame to accommodate the plate-holders of varying thickness.

9. In a photographic camera, a sectional frame comprising corner-pieces having dovetail slots, centrally-disposed sections for uniting the corner-sections, said central sections each comprising a slotted strip disposed in front of the corner-pieces and a dovetail block adapted to the recesses of the corner-sections, a sectional bellows having portions secured to the corner-sections and other portions secured to the central sections, and means for locking said sections in an adjusted position.

10. In a photographic camera, a sectional frame, edge strips arranged exteriorly thereof, the top and one of the side strips being extended rearwardly beyond the frame to form a pocket for the reception of the plate-holder.

In testimony that I claim the foregoing as my own I have hereto affixed my signature in the presence of two witnesses.

CHRISTIAN FREDERIK JULIUS NISS.

Witnesses:
ALBERT W. LEIFHEIT,
EDUARD NIELSEN.